(12) United States Patent
Yamada

(10) Patent No.: US 8,075,817 B2
(45) Date of Patent: Dec. 13, 2011

(54) IN-LINE SCREW TYPE INJECTION MOLDING MACHINE AND METHOD OF CONTROLLING THE SAME

(75) Inventor: Akio Yamada, Akashi (JP)

(73) Assignee: Toyo Machinery & Metal Co., Ltd., Akashi-shi (JP)

( * ) Notice: Subject to any disclaimer, the term of this patent is extended or adjusted under 35 U.S.C. 154(b) by 0 days.

(21) Appl. No.: 12/933,926

(22) PCT Filed: Feb. 23, 2009

(86) PCT No.: PCT/JP2009/053209
§ 371 (c)(1),
(2), (4) Date: Sep. 22, 2010

(87) PCT Pub. No.: WO2009/122822
PCT Pub. Date: Oct. 8, 2009

(65) Prior Publication Data
US 2011/0018156 A1    Jan. 27, 2011

(30) Foreign Application Priority Data
Mar. 31, 2008  (JP) .................. 2008-091366

(51) Int. Cl.
*B29C 45/76* (2006.01)
(52) U.S. Cl. ............... 264/40.1; 264/40.5; 425/145
(58) Field of Classification Search ........... 264/40.1, 264/40.5, 40.7; 425/145
See application file for complete search history.

(56) References Cited

U.S. PATENT DOCUMENTS

| | | | | |
|---|---|---|---|---|
| 5,869,108 A | * | 2/1999 | Hiraoka | 425/145 |
| 6,365,075 B1 | * | 4/2002 | Kamiguchi et al. | 264/40.3 |
| 6,733,265 B1 | * | 5/2004 | Schmidt | 425/145 |
| 7,234,928 B2 | | 6/2007 | Emoto et al. | |
| 2004/0173925 A1 | * | 9/2004 | Melkus | 264/40.5 |
| 2006/0288791 A1 | | 12/2006 | Shiozawa et al. | |

(Continued)

FOREIGN PATENT DOCUMENTS
EP    1 316 406 A1    6/2003
(Continued)

OTHER PUBLICATIONS

International Search Report dated Mar. 24, 2009 including English-translation (Four (4) pages).

*Primary Examiner* — Jill Heitbrink
(74) *Attorney, Agent, or Firm* — Crowell & Moring LLP

(57) ABSTRACT

The invention is to provide an in-line screw type injection molding machine which can have a simplified configuration of an injection mechanism and a metering mechanism. The in-line screw type injection molding machine is characterized by comprising: a metering motor 9 which rotationally drives a rear end side of a screw; a screw mechanism which includes a nut body rotating integrally with the screw, and a screw shaft fitted to the nut body, the screw mechanism converting rotational motion of the screw shaft into linear motion of the screw through the nut body; an injection motor 16 which rotationally drives the screw shaft; an injection motor drive circuit which drives the injection motor 16 to allow a position of the screw to follow a predetermined position command pattern; a metering motor drive circuit which drives the metering motor 9 to allow rotation of the metering motor 9 to follow a predetermined speed setting pattern; and an adder-subtracter circuit which adds or subtracts a speed setting pattern signal of the metering motor drive circuit to or from a speed command signal of the injection motor drive circuit so as to compensate an axial displacement of the screw caused by the rotation of the metering motor 9.

4 Claims, 4 Drawing Sheets

U.S. PATENT DOCUMENTS

2011/0159133 A1 * 6/2011 Taniguchi ............... 425/145

FOREIGN PATENT DOCUMENTS

| | | |
|---|---|---|
| JP | 5-77287 A | 3/1993 |
| JP | 5-345337 A | 12/1993 |
| JP | 9-254221 A | 9/1997 |
| JP | 2000-71304 A | 3/2000 |
| JP | 2002-321264 A | 11/2002 |
| JP | 2006-346873 A | 12/2006 |
| WO | WO 99/65660 A1 | 12/1999 |

* cited by examiner

IN-LINE SCREW TYPE INJECTION MOLDING MACHINE AND METHOD OF CONTROLLING THE SAME

TECHNICAL FIELD

The present invention relates to an in-line screw type injection molding machine, and particularly relates to an in-line screw type injection molding machine provided with a drive mechanism for rotationally driving a screw and further axially driving the screw during metering and injection.

BACKGROUND ART

As an injection molding machine, there is known an in-line screw type injection molding machine, which moves a screw backward while rotating the screw to melt a plastic material while metering the plastic material, and then suspends the rotation of the screw and moves the screw forward to inject the molten resin into a mold and fill the mold with the molten resin. This type injection molding machine has a metering motor as means for rotationally driving the screw, and an injection motor as means for injecting the molten resin to fill the mold therewith, and these motors are disposed axially in series (see Patent Document 1).

The metering motor is, for example, coupled with a base coupled with a rear end of the screw, and the injection motor rotationally drives a screw shaft abutting against the base so as to axially move the base along the screw shaft.

Then, the metering motor is driven to rotate the screw, while the injection motor is driven to drive the screw shaft, so as to move the screw backward while rotating the screw to melt the resin while metering the resin and to rotate the screw shaft reversely to thrust the screw forward through the screw shaft to thereby inject the resin.

FIG. 4 is a diagram for explaining a control circuit of an in-line screw type injection molding machine in the background art. The injection molding machine has a screw 6 which is, for example, disposed in a heating cylinder rotatably and movably forward/backward, a metering motor 9 which rotationally drives the screw 6, and an injection motor 16 which drives the screw 6 forward/backward.

When the screw 6 in the heating cylinder is rotated backward (clockwise in view from the illustrated motor shaft end), raw resin (for example, thermoplastic resin) supplied from a hopper is kneaded in the heating cylinder and moved toward the front end (left side) of the screw while being plasticized. Thus, metered molten resin is accumulated on the front end side. Next, the injection motor 16 is rotated forward suddenly. On this occasion, the screw 6 is pressed to the illustrated left so as to move forward suddenly. In this manner, the molten resin is injected into a not-shown mold through a nozzle.

An injection motor encoder 57 measures the rotational position of the injection motor 16, and a metering motor encoder 58 measures the rotational position of the metering motor 9. The injection encoder 57 is an absolute type encoder which outputs the absolute value of the rotational position, and the metering motor encoder 58 is an incremental encoder. A load cell 49 is a sensor for measuring an injection pressure and a back pressure imposed on the screw 6.

In FIG. 4, xij0 designates a backward position command pattern signal indicating a backward position of the screw, vij0 designates a backward speed command pattern signal indicating a backward speed of the screw, bp0 designates aback pressure setting pattern signal for setting a back pressure to be imposed on the screw, and vcg0 designates a metering motor rotational speed setting pattern signal for setting a rotational speed of the metering motor. These signals are, for example, supplied from a not-shown host controller.

A deviation e1 between the backward position command pattern signal xij0 and a screw position signal xijm is taken by an adder 32 using the screw position signal xijm as a feedback signal. The injection motor 16 is feedback-controlled based on the deviation e1.

The screw position signal xijm can be obtained based on the rotational displacement of the injection motor 16 from a reference position.

A PID controller 33 for the backward position command calculates an operation quantity u1 with which the screw position should be operated, based on the deviation e1. A speed calculator 34 calculates a speed command v1 based on the operation quantity u1. An adder 35 adds the backward speed command pattern signal vij0 as a feed-forward signal to the speed command v1 to obtain a backward speed control value v3. A minimum value selector 36 selects a smaller one of a back-pressure speed command calculated value v2, which will be described later, and the backward speed control value v3. The minimum value selector 36 outputs the selected value as a screw backward speed command vij.

A servo amplifier 38 controls the rotation of the injection motor 16 in accordance with the speed command vij. The rotational position of the injection motor is supplied to the adder 32 through the servo amplifier 38.

A PID controller 44 for setting the back pressure calculates an operation quantity u2 based on a deviation e2 between the back pressure bp0 indicated by the backpressure setting pattern and the back pressure measured by the load cell 49, which deviation e2 is obtained by an adder 43. A speed calculator 45 calculates a back-pressure speed command v2 based on the operation quantity u2, and supplies the calculation result to the minimum value selector 36. Thus, even when the back-pressure speed command value v2 is excessively large to pass over the backward position of the screw 6, the screw 6 can be prevented from passing over the position set by the backward position command pattern xij0

The metering motor rotational speed setting pattern signal vcg0 is supplied to a servo amplifier 47. The servo amplifier 47 controls driving of the metering motor 9 in accordance with the metering motor rotational speed setting pattern signal vcg0.

Patent Document 1: JP-A-5-345337

DISCLOSURE OF THE INVENTION

Problems that the Invention is to Solve

In the in-line screw type injection molding machine in the background art, for example, the metering motor is coupled with the base coupled with the rear end of the screw, and the injection motor rotationally drives the screw shaft abutting against the base to axially move the base along the screw shaft.

When an injection mechanism and a metering mechanism are configured thus to abut against each other, the configuration of the injection mechanism and the metering mechanism becomes complicated. In addition, when the injection mechanism and the metering mechanism are designed to be screwed to each other through the screw shaft and a nut body screwed on the screw shaft, the screw will move forward or backward if the injection motor is suspended during metering.

An injection molding machine using electric motors of such mechanisms includes an injection motor for moving a screw forward/backward and a metering motor for rotating the screw. Cooperative control of the two electric motors is needed for molding. Accordingly, the control becomes so complicated and troublesome that it is difficult to obtain a desired injection rate and a desired pressure. Particularly during plasticizing in which the screw is moved backward due to the pressure of the resin while being rotated, the screw passes over its backward position easily.

The present invention was accomplished in consideration of these problems. An object of the invention is to provide an in-line screw type injection molding machine having a simplified configuration of the injection mechanism, the metering mechanism and the control circuit.

Means for Solving the Problems

In order to attain the aforementioned problems, the present invention uses the following means.

In an in-line screw type injection molding machine, a screw in a heating cylinder is rotated to knead and plasticize raw resin while transferring the resin toward a forward end side of the screw to thereby reserve metered molten resin on the front end side, and the screw is moved forward to inject the molten resin into a mold to thereby fill the mold with the molten resin. The in-line screw type injection molding machine includes: a metering motor which is disposed on a rear end side of the screw and rotationally drives the rear end side of the screw; a screw mechanism which includes a nut body attached to the rear end side of the screw and rotating integrally with the screw, and a screw shaft fitted to the nut body, the screw mechanism converting rotational motion of an injection motor for rotationally driving the screw shaft into linear motion of the screw through the nut body; an injection motor drive circuit which drives the injection motor to allow a position of the screw to follow a predetermined position command pattern; a metering motor drive circuit which drives the metering motor to allow rotation of the metering motor to follow a predetermined speed setting pattern; and an adder-subtracter circuit which adds or subtracts a speed setting pattern signal of the metering motor drive circuit to or from a speed command signal of the injection motor drive circuit so as to compensate an axial displacement of the screw caused by the rotation of the metering motor.

EFFECT OF THE INVENTION

Since the present invention has the aforementioned configuration, it is possible to simplify the configuration of the injection mechanism, the metering mechanism and the control circuit.

BEST MODE FOR CARRYING OUT THE INVENTION

The best embodiment will be described below with reference to the accompanying drawings. FIG. 1 is a diagram for explaining the outline of an in-line screw type injection molding machine according to the embodiment. In FIG. 1(a), the reference numeral 1 represents a head stock disposed on a not-shown injection unit base plate; 2, a retention plate disposed likewise on the not-shown injection unit base plate so as to face the head stock 1 at a predetermined distance therefrom; 3, a heating cylinder whose rear end portion is fixed to the head stock 1; 4, a nozzle attached to the front end of the heating cylinder 3; 5, a band heater wound on the outer circumference of the heating cylinder 3; 6, a screw disposed rotatably and movably forward/backward in the heating cylinder 3; and 1a and 3a, raw resin supply holes provided in the head stock 1 and the heating cylinder 3 respectively so that raw resin dropping down and supplied from a not-shown hopper can be supplied into the rear end portion of the heating cylinder 3.

In addition, the reference numeral 7 represents a connection bar which is laid between the head stock 1 and the retention plate 2; 8, a linear motion body provided on a not-shown rail member through a linear motion guide movably forward/backward between the head stock 1 and the retention plate 2; 9, an internally hollow built-in type metering motor (hereinafter referred to as "metering motor 9") mounted on the linear motion body 8; 10, a casing of the metering motor 9; 11, a cylindrical stator of the metering motor 9 which stator is fixed to the casing 10; 12, a cylindrical rotor of the metering motor 9 which rotor can rotate inside the stator 11; 13, a sleeve which is fixed to the inner circumferential surface of the rotor 12 by tight fitting or the like; 14, a bearing which is inserted between the casing 10 and the sleeve 13 so as to rotatably support the sleeve 13; and 15, a rotary coupler which is fixed to the sleeve 13 so as to fix the base end portion of the screw 6.

In addition, the reference numeral 16 represents an internally hollow built-in type injection motor (hereinafter referred to as "injection motor 16") which is mounted on the retention plate 2; 17, a casing of the injection motor 16; 18, a cylindrical stator of the injection motor 16 which stator is fixed to the casing 17; 19, a cylindrical rotor of the injection motor 16 which rotor can rotate inside the stator 18; and 20, a sleeve which is fixed to the inner circumferential surface of the rotor 19 by tight fitting or the like. Though shown by simplified illustration, the sleeve 20 is rotatably retained in the casing 17 with a not-shown bearing.

In addition, the reference numeral 21 represents a ball screw mechanism for converting the rotation of the injection motor 16 into linear motion; 22, a screw shaft of the ball screw mechanism 21 (rotary portion of the ball screw mechanism 21) which is rotatably retained on the retention plate 2 through a bearing 24; 23, a nut body of the ball screw mechanism 21 (linear motion portion of the ball screw mechanism 21) which is screwed on the screw shaft 22 so as to linearly move along the screw shaft 22 in accordance with the rotation of the screw shaft 22 while an end portion of the nut body 23 is fixed to the sleeve 13 of the metering motor 9 side directly or through a suitable member; and 25, a coupler which couples and fixes the sleeve 20 of the injection motor 16 side and an end portion of the screw shaft 22 to each other.

In this embodiment, in a metering process, the metering motor 9 is driven and controlled by rotational speed (rotational frequency) feedback control in accordance with a command from a control circuit through a servo amplifier which will be described later. The control circuit which will be described later administers the control of the machine (injection molding machine) as a whole. As a result, the screw 6 rotates in a predetermined direction integrally with the sleeve 13 and the rotary coupler 15. In a typical metering operation, due to the rotation of the screw 6, raw resin supplied from a not-shown hopper to the rear end side of the screw 6 through the raw resin supply holes 1a and 3a is kneaded and plasticized while being moved forward by the screw feed action of the screw 6. According to this embodiment, however, the nut body 23 fixed to the sleeve 13 also rotates when the screw 6 rotates in the predetermined direction. Thus, due to the rotation of the nut body 23 caused by the rotational driving of the screw 6, the nut body 23 moves linearly along the screw shaft 22. Therefore, in order to cancel the linear motion of the nut body 23 (linear motion of the metering motor 9 or the screw 6) due to the rotation of the nut body 23 caused by the rotational driving of the screw 6, the control circuit drives and controls the injection motor 16 through a servo driver 38 which will be described later. The control is performed by pressure feedback control with a set back pressure as an intended value. Thus, the screw 6 is moved backward by proper control as the molten resin is fed to the front end side of the screw 6 while the back pressure imposed on the screw 6 is kept in a predetermined pressure. For example, when the metering motor 9 is rotated at 10 revolutions per unit time, the injection motor 16 is rotated at 9.9 revolutions per unit time. Thus, the screw 6 is controlled to be given a predetermined back pressure while the linear motion of the nut body 23 due to the rotation of the nut body 23 caused by the rotational driving of the screw 6 is cancelled. As soon as one shot of molten resin is reversed on the front end side of the screw 6, the rotational driving of the screw 6 by the metering motor 9 is suspended.

On the other hand, in an injection/filling process, at a proper timing after the completion of metering, the injection motor 16 is driven and controlled by speed feedback control with the servo driver 38 which will be described later, in accordance with a command from the control circuit which will be described later. As a result, the rotation of the injection motor 16 is converted into linear motion by the ball screw mechanism 21, and the linear motion is transmitted to the screw 6 through the aforementioned linear motion transmission system. Thus, the screw 6 is driven to move forward suddenly, so that the molten resin reserved on the front end side of the screw 6 can be injected into a cavity of a not-shown mold which has been clamped, and the cavity can be therefore filled with the resin. Thus, a primary injection process is achieved. In a pressure holding process following the primary injection process, the injection motor 16 is driven and controlled by not-shown pressure feedback control through the servo driver 38 in accordance with a command from the control circuit. Thus, a holding pressure which has been set is given from the screw 6 to the resin in the not-shown mold.

FIG. 1(b) is a diagram for explaining the driving directions of the metering motor 9 and the injection motor 16 during injection of the resin, during metering and during back injection (suck back).

As shown in FIG. 1(b), (1) during injection, only the injection motor 16 is rotated backward (clockwise in view from the motor mounting plane). Thus, the screw 6 is driven to the left suddenly. (2) During metering (also referred to as "during plasticizing", when raw resin is plasticized and metered), the metering motor 9 is rotated forward (counterclockwise in view from the motor mounting plane). Thus, the resin kneaded and plasticized in the heating cylinder is moved toward the front end side (left side) of the screw, and metered molten resin is accumulated on the front end side.

As mentioned above, the nut body 23 coupled with the screw 6 also rotates forward (counterclockwise in view from the direction of the illustrated arrow) when the screw 6 is rotationally driven forward (counterclockwise in view from the direction of the illustrated arrow) by the metering motor 9. If the injection motor 16 for rotationally driving the screw shaft 22 screwed down to the nut body 23 were still suspended on this occasion, the nut body 23 and the screw 6 coupled therewith would move to the illustrated right.

In order to cancel the movement, the injection motor 16 is rotationally driven in the same (backward) direction as the metering motor 9 by the same displacement as described previously. When the rotational displacement of the injection motor 16 is set to be slightly smaller than that of the metering motor 9, the screw 6 can be moved to the right gradually to give an optimal back pressure to the screw 6. (3) During back injection, the injection motor 16 is driven forward to drive the screw 6 to the illustrated right in the state where driving the metering motor 9 has been suspended. Thus, leakage of resin from the nozzle 4 can be suppressed.

FIG. 2 is a diagram for explaining the control circuit for controlling driving of the injection motor 16 and the metering motor 9. In FIG. 2, xij0 designates a backward position command pattern signal indicating the backward position of the screw; vij0, a backward speed command pattern signal indicating the backward speed of the screw; bp0, a back pressure setting pattern signal for setting a back pressure imposed on the screw; and vcg0, a metering motor rotational speed setting pattern signal for setting a rotational speed of the metering motor. These signals are, for example, supplied from a not-shown host controller.

A deviation e1 between the backward position command pattern signal xij0 and a screw position signal xijm calculated in an adder 52 as will be described later is taken by an adder 32 using a screw position signal xijm as a feedback signal. The injection motor 16 is feedback-controlled based on the deviation e1.

The screw position signal xijm can be obtained from the difference between the rotational displacement (the absolute value of the rotational angle) of the injection motor 16 from a reference position and the rotational displacement (the absolute value of the rotational angle) of the metering motor 9 from a reference position (when the rotational directions of the two motors coincide with each other) or the sum of those rotational displacements (when the rotational directions of the two motors do not coincide with each other). The calculation of the sum or the difference can be performed by changing a coefficient of a multiplier 51.

A PID calculator 33 for the backward position command calculates an operation quantity u1 with which the screw position should be operated, based on the deviation e1. A speed calculator 34 calculates a speed command v1 based on the operation quantity u1. An adder 35 adds the backward speed command pattern signal vij0 as a feed-forward signal vff to the speed command v1 to obtain a backward speed control value v3. A minimum value selector 36 selects a smaller one of a back-pressure speed command calculated value v2, which will be described later, and the backward speed control value v3. The minimum value selector 36 outputs the selected value as a screw backward speed command value v4.

An adder 37 adds (when the rotational directions of the two motors do not coincide with each other) or subtracts (when the rotational directions of the two motors coincide with each other) the metering motor rotational speed setting pattern signal vcg0 (rotation correction value v5) to or from the screw backward speed command value v4, and supplies the calculation result as a speed command vij to the servo amplifier 38. The servo amplifier 38 controls the rotation of the injection motor 16 in accordance with the speed command vij. The rotational position of the injection motor 16 is measured by an encoder attached to the injection motor 16, and supplied to the adder 52 through the servo amplifier 38.

A PID controller 44 for setting the back pressure calculates an operation quantity u2 based on a deviation e2 between the back pressure bp0 indicated by the back pressure setting pattern and the back pressure measured by the load cell 49, which deviation e2 is obtained by an adder 43. A speed calculator 45 calculates a back-pressure speed command v2 based on the operation quantity u2, and supplies the calculation result to the minimum value selector 36. Thus, even when the back-pressure speed command value v2 is excessively large to pass over the backward position of the screw 6, the screw 6 can be prevented from passing over the position set by a backward position command xij.

The metering motor rotational speed setting pattern signal vcg0 is supplied to a servo amplifier 47. The servo amplifier 47 controls driving of the metering motor 9 in accordance with the metering motor rotational speed setting pattern signal vcg0.

As mentioned previously, the metering motor 9 rotational speed setting pattern signal vcg0 supplies the position where the screw 6 should be moved backward due to the rotation of the metering motor, as a rotation correction signal v5 to the adder 37. That is, the rotational speed setting pattern signal vcg0 (rotation correction value v5) of the metering motor 9 is added to (when the rotational directions of the two motors do not coincide with each other) or subtracted from (when the rotational directions of the two motors coincide with each other) the rotational speed command value (screw backward speed command value v4) of the injection motor 16 so as to correct the speed command vij for the injection motor servo amplifier 38 in advance. Thus, the speed command vij can be outputted to the injection motor servo amplifier 38 quickly in accordance with a change of the position where the screw 6 should be moved backward due to the rotation of the metering motor 9.

FIG. 3 is a diagram for explaining changes of various control quantities in the control circuit shown in FIG. 2. In FIG. 3, (a) designates the screw position xij0; (b), the screw backward speed control value v3 and the screw backward speed command value v4; (c), the injection speed command vij and the metering motor rotational speed setting pattern signal (value corrected in the rotation direction) v5; (d), the back pressure setting pattern signal bp0; and (e), the metering motor rotational speed command vcg0.

As shown in FIG. 3(b), of the screw backward speed control value v3 calculated from the backward position command pattern xij0 and the backward speed command pattern vij0 and the back-pressure speed command calculated value v2 calculated from the back pressure setting pattern bp0, a smaller one is selected as the screw backward speed command v4.

As shown in FIG. 3(c), the rotation-direction correction value v5 of the metering motor rotational speed setting pattern signal is added to the screw backward speed command v4 to generate the speed command vij for the injection motor servo amplifier 38.

As described above, according to this embodiment, as shown in FIG. 1, a metering mechanism and an injection mechanism using an in-line screw can be formed integrally. It is therefore possible to form the metering mechanism and the injection mechanism compactly and inexpensively. In addition, when the injection mechanism and the metering mechanism are formed integrally, operational interference may occur between these mechanisms. However, the interference can be canceled by adding changes (for example, the adders 52 and 37 shown in FIG. 2) to the control circuit. That is, according to this embodiment, the injection mechanism and the metering mechanism can be integrated to reduce the cost, while the complication of control caused by the integration can be absorbed by adding the changes to the control circuit.

Figure 1:
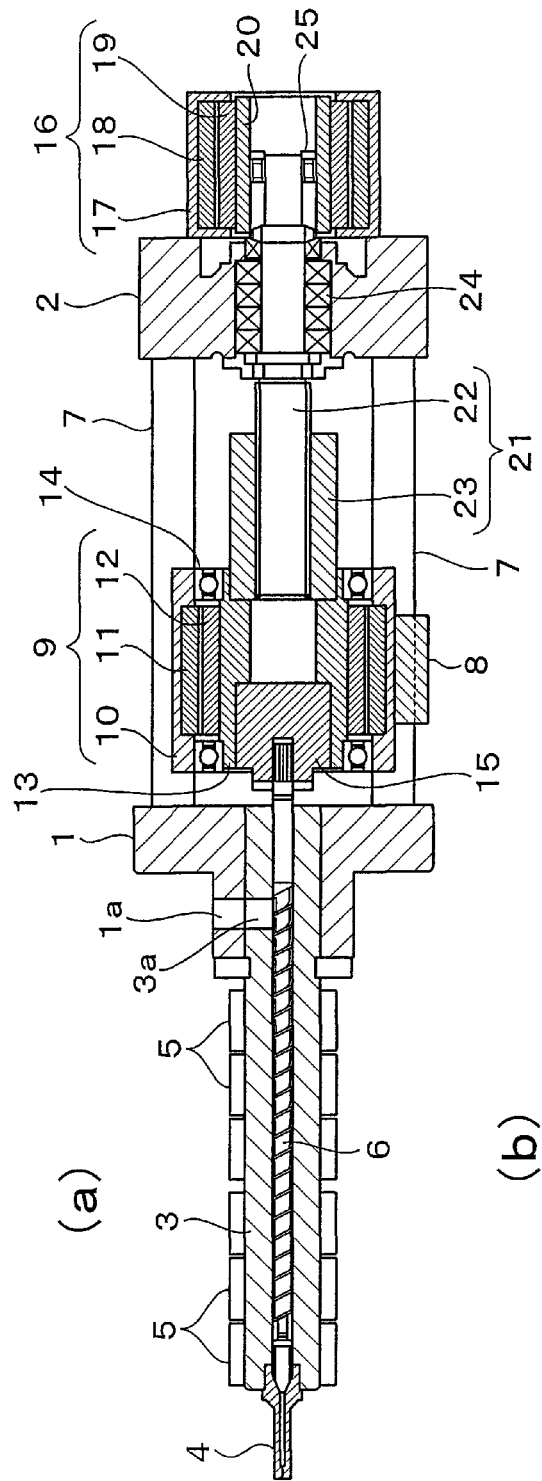
FIG. 1 A diagram for explaining the outline of an in-line screw type injection molding machine according to an embodiment.
Figure 2:
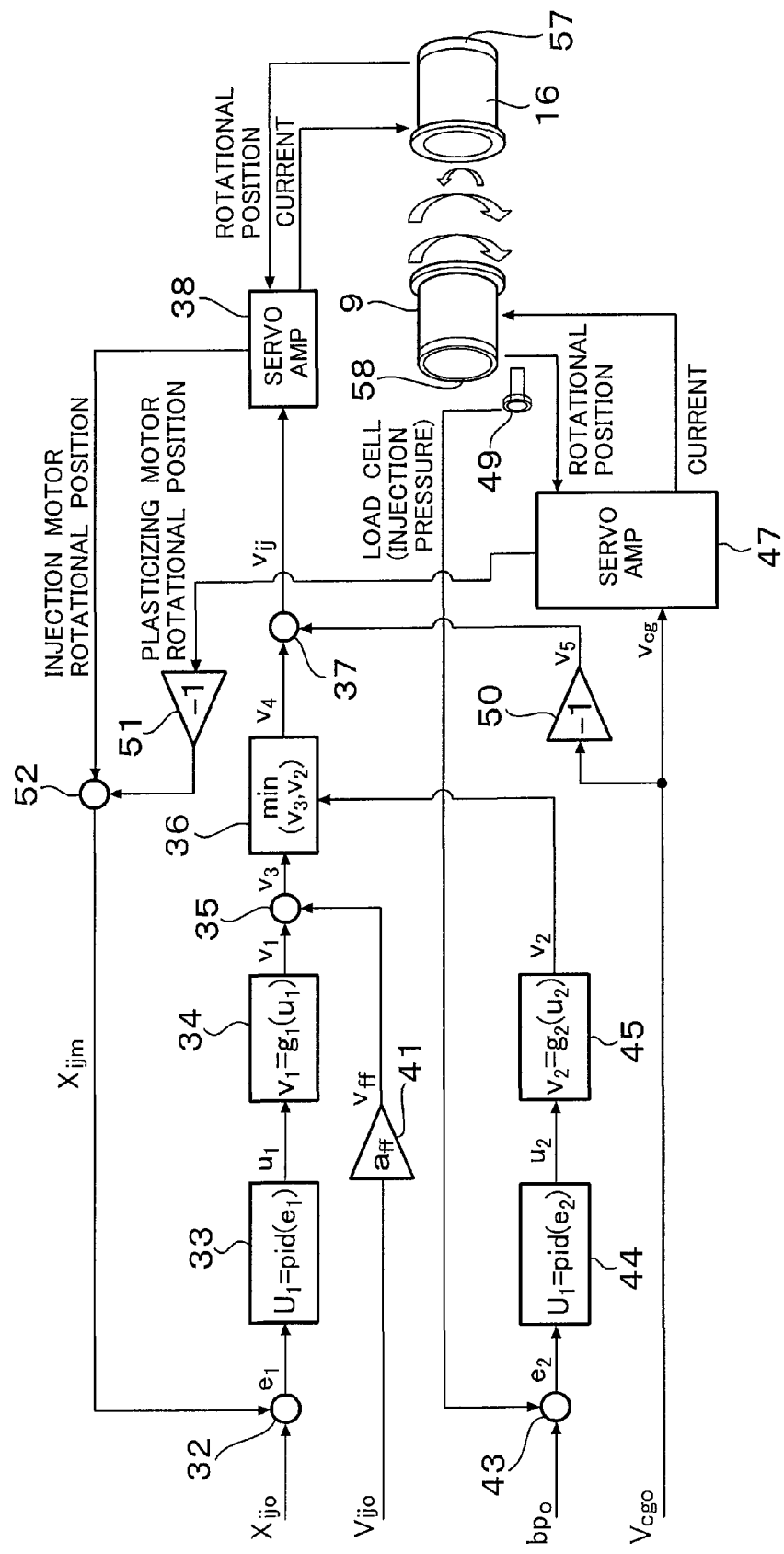
FIG. 2 A diagram for explaining a control circuit for controlling driving of an injection motor and a metering motor.
Figure 3:
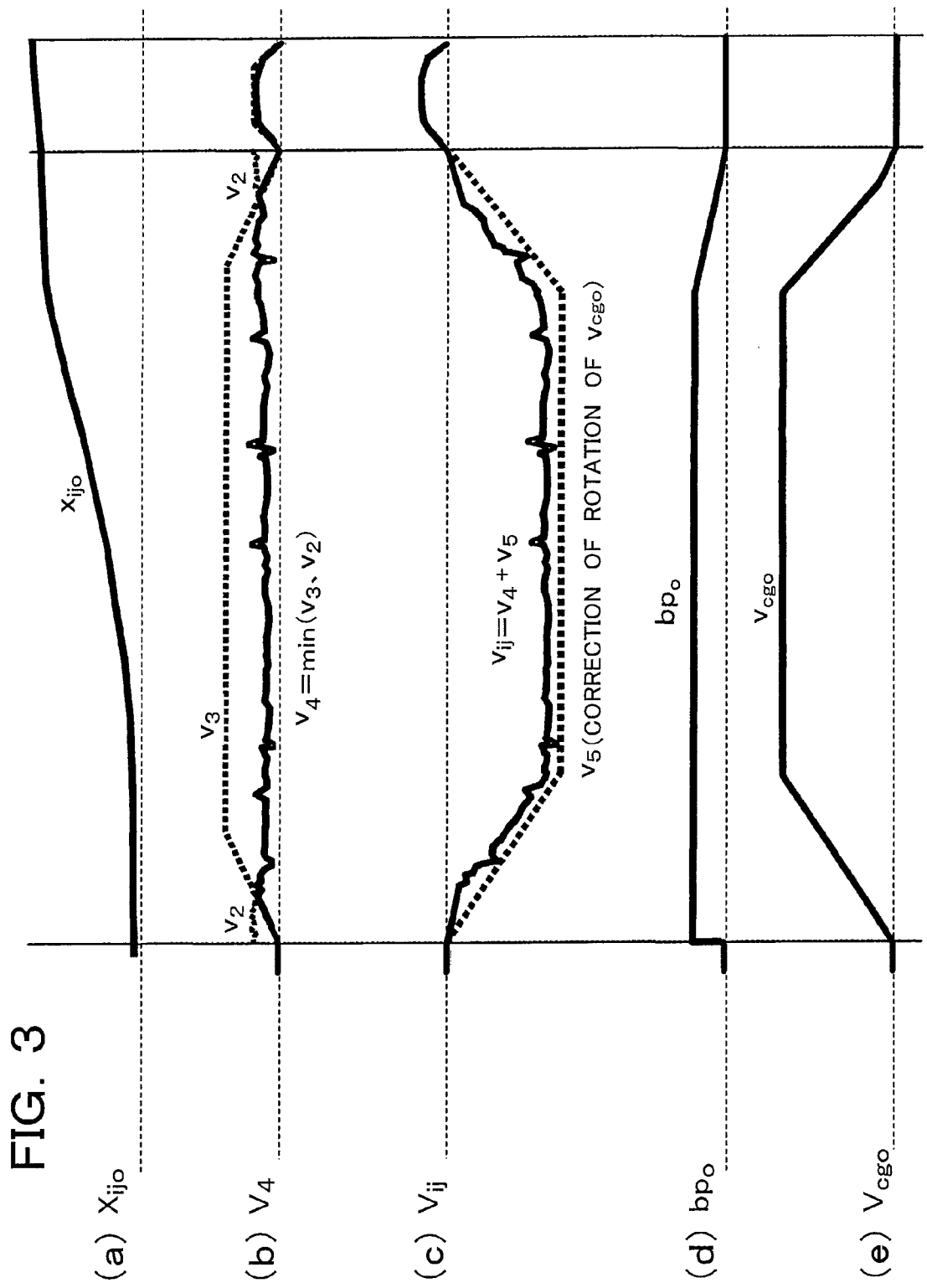
FIG. 3 A diagram for explaining changes of various control quantities in the control circuit shown in FIG. 2.
Figure 4:
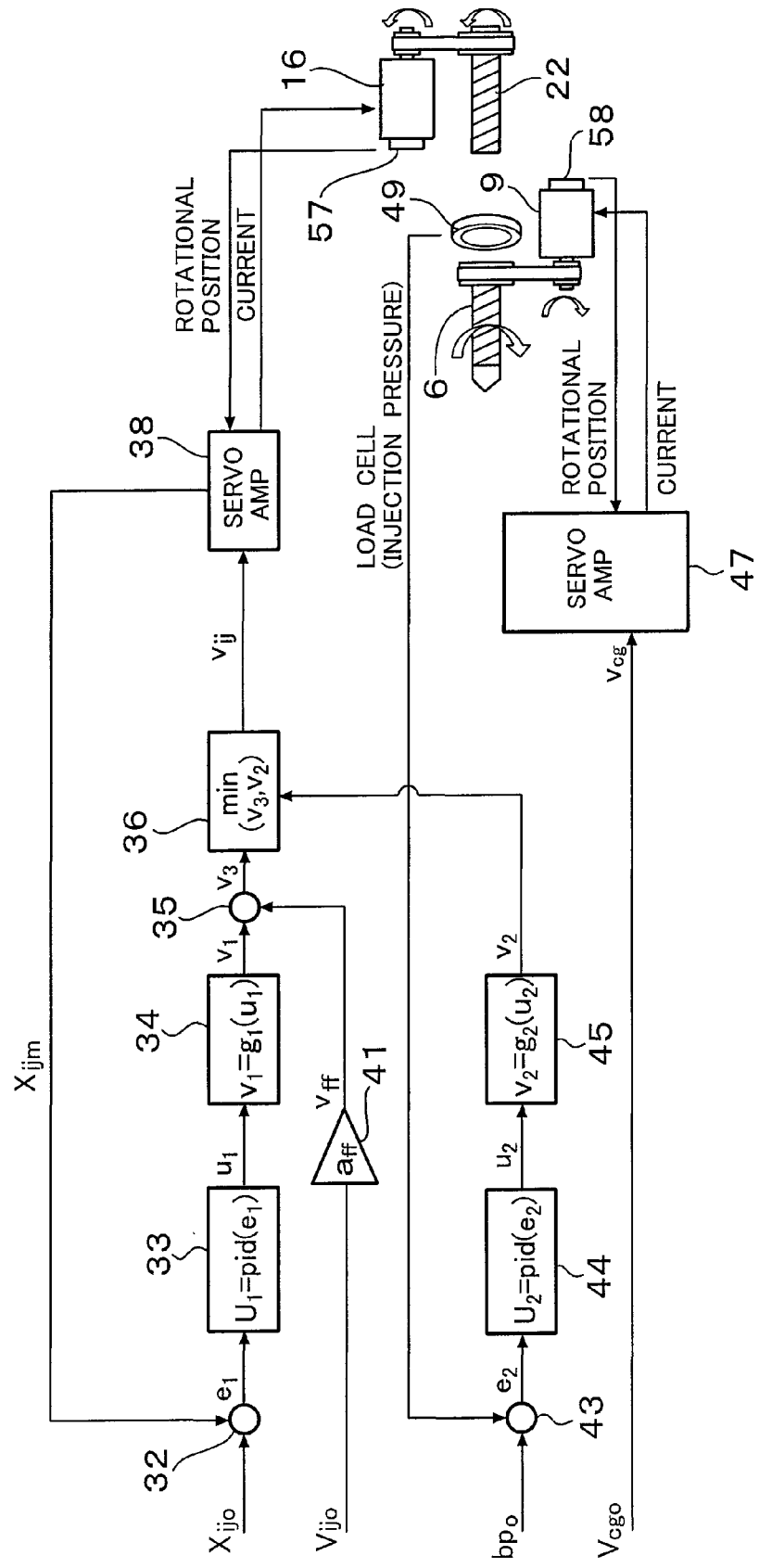
FIG. 4 A diagram for explaining a control circuit of an in-line screw type injection molding machine in the background art.

DESCRIPTION OF REFERENCE NUMERALS 1 head stock
1a raw resin supply hole
2 retention plate
3 heating cylinder
3a raw resin supply hole
4 nozzle
5 band heater
6 screw
7 connection bar
8 linear motion body
9 metering built-in type motor (metering motor)
10 casing
11 stator
12 rotor
13 sleeve
14 bearing
15 rotary coupler
16 injection built-in type motor (injection motor)
17 casing
18 stator
19 rotor
20 sleeve
21 ball screw mechanism
22 screw shaft (rotary portion of ball screw mechanism)
23 nut body (linear motion portion of ball screw mechanism)
24 bearing
25 coupler
32 adder
33 PID calculator
34 speed calculator
35 adder
36 minimum value selector
37 adder
38 servo amplifier
43 adder
44 PID calculator
44 speed calculator
47 servo amplifier
49 load cell
50,51 multiplier
52 adder
57,58 encoder

The invention claimed is:
1. An in-line screw type injection molding machine in which a screw in a heating cylinder is rotated to knead and plasticize raw resin while transferring the resin toward a forward end side of the screw to thereby reserve metered molten resin on the front end side, and the screw is moved forward to inject the molten resin into a mold to thereby fill the mold with the molten resin, the in-line screw type injection molding machine being characterized by comprising:
a metering motor which is disposed on a rear end side of the screw and rotationally drives the rear end side of the screw;
a screw mechanism which includes a nut body attached to the rear end side of the screw and rotating integrally with the screw, and a screw shaft fitted to the nut body, the screw mechanism converting rotational motion of the screw shaft into linear motion of the screw through the nut body;

an injection motor which rotationally drives the screw shaft as a constituent member of the screw mechanism;

an injection motor drive circuit which drives the injection motor to allow a position of the screw to follow a predetermined position command pattern;

a metering motor drive circuit which drives the metering motor to allow rotation of the metering motor to follow a predetermined speed setting pattern; and an adder-subtracter circuit which adds or subtracts a speed setting pattern signal of the metering motor drive circuit to or from a speed command signal of the injection motor drive circuit so as to compensate an axial displacement of the screw caused by the rotation of the metering motor.

2. An in-line screw type injection molding machine according to claim 1, characterized by further comprising:

an injection motor rotation encoder which measures a rotational position of the screw shaft, and a metering motor rotation encoder which measures a rotational position of the metering motor, wherein an output of the metering motor rotation encoder is added to or subtracted from an output of the injection motor rotation encoder to measure the position of the screw.

3. An in-line screw type injection molding machine according to claim 2, characterized in that:

the injection motor rotation encoder and the metering motor rotation encoder are absolute type encoders each outputting an absolute value of a rotational position.

4. A method for controlling an in-line screw type injection molding machine in which a screw in a heating cylinder is rotated to knead and plasticize raw resin while transferring the resin toward a forward end side of the screw to thereby reserve metered molten resin on the front end side, and the screw is moved forward to inject the molten resin into a mold to thereby fill the mold with the molten resin, the in-line screw type injection molding machine including a metering motor which is disposed on a rear end side of the screw and rotationally drives the rear end side of the screw, and a screw shaft which is fitted to a nut body attached to the rear end side of the screw and rotating integrally with the screw, rotational motion of an injection motor being converted into linear motion of the screw through the screw shaft, the method being characterized by comprising the steps of:

driving the injection motor to allow a position of the screw to follow a predetermined position command pattern, and driving the metering motor to allow rotation of the metering motor to follow a predetermined speed setting pattern; and adding or subtracting a speed setting pattern signal of the metering motor drive circuit to or from a speed command signal of the injection motor drive circuit so as to compensate an axial displacement of the screw caused by the rotation of the metering motor.

* * * * *